UNITED STATES PATENT OFFICE.

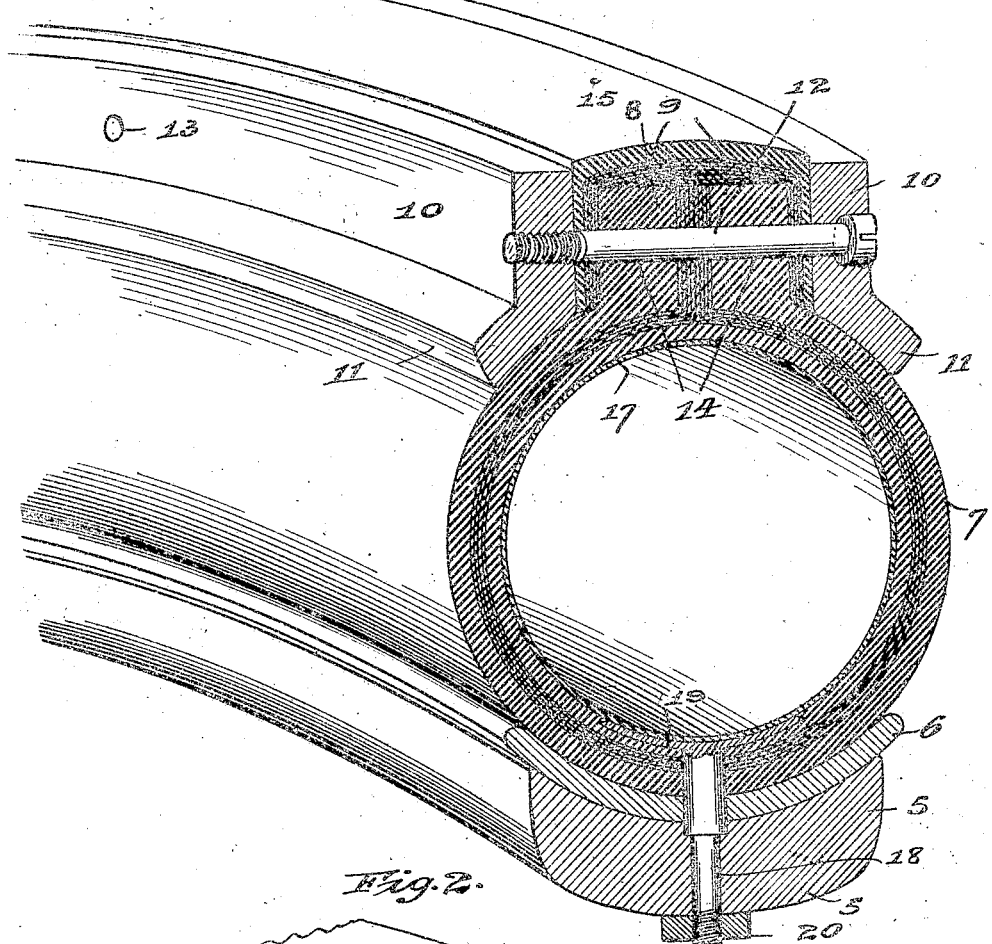
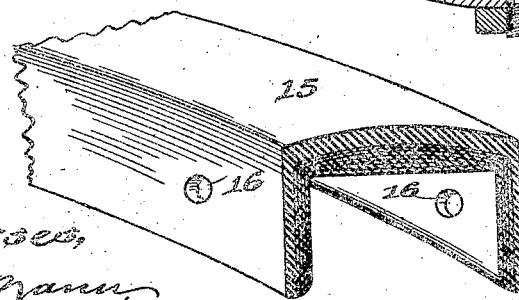

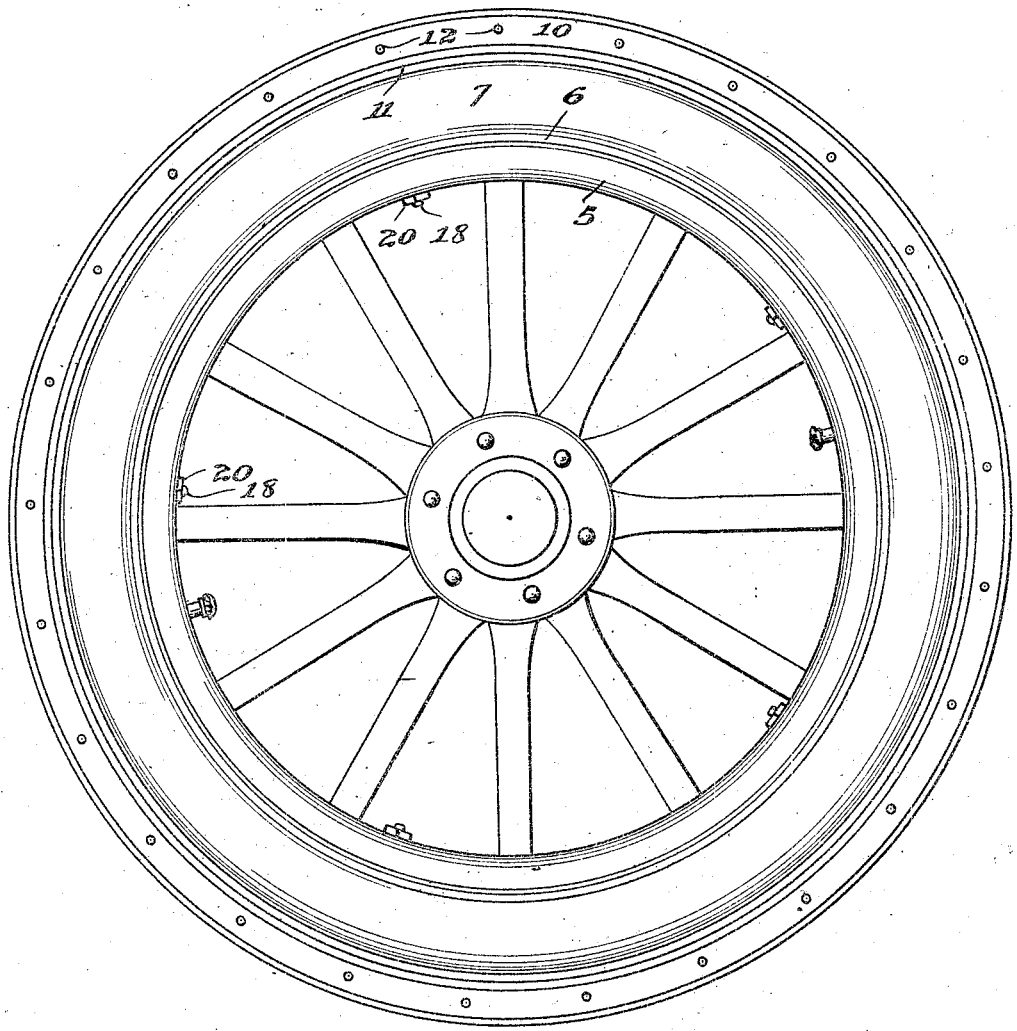

JOHN L. G. DYKES, OF MILFORD, ILLINOIS.

VEHICLE-TIRE.

No. 897,726.

Specification of Letters Patent.

Patented Sept. 1, 1908.

Application filed July 30, 1906, Serial No. 328,397. Renewed May 6, 1908. Serial No. 431,162.

*To all whom it may concern:*

Be it known that I, JOHN L. G. DYKES, a citizen of the United States, residing at Milford, in the county of Iroquois and State of Illinois, have invented certain new and useful Improvements in Vehicle-Tires, of which the following is a specification.

This invention relates to improvements in pneumatic vehicle tires, and more particularly to that class of heavy tires at present extensively employed on automobiles and large trucks.

The main object of the invention is to increase the durability, strength, and general wearing qualities of such tires without detracting from the resiliency afforded by the pneumatic type of construction.

To this end the invention consists of a tire having the peculiarities of construction hereinafter particularly pointed out, and chiefly characterized by the employment in connection with a tire longitudinally split on its outer periphery, of an annular closure for said split peripheral portion forming the tread of the tire. In the preferred form this closure consists of a pair of metal rings clamped to the opposite sides of the split periphery of the tire by means of bolts passing therethrough and through the intermediate portion of the tire.

The invention will be readily understood when considered in connection with the accompanying drawings showing a practical embodiment thereof, in which,—

Figure 1 is a perspective view in cross-section through a tire embodying my improvements; Fig. 2 is a similar detail view of an annular cap member which is preferably employed in connection with the clamping rings to exclude dirt and moisture from the tire envelop; and Fig. 3 is a side elevational view of an automobile wheel showing my improved tire applied thereto.

Referring to the drawings, 5 may designate the felly, and 6 a metal rim or band secured thereon and forming the seat for the sheath or envelop 7 of the tire proper. This latter is split longitudinally of its outer periphery or tread portion, as shown at 8, and is provided on either side of such longitudinal division with a radial projecting flange 9 of considerable thickness.

10 designates each of a pair of metal rings, preferably steel, which lie opposite and against the outer sides of the flanges 9, and are preferably provided with integral outwardly flaring base portions 11 that fit and seat on the outer surface of the tire sheath; said rings being clamped to the tire by through-bolts 12 passed through registering apertures 13 and 14 in the rings and tire flanges, respectively.

Preferably, and as herein shown, I employ in association with the parts above described an annular cap in the form of a channel-shaped member 15 of a suitable size to fit over the combined flanges 9 of the tire sheath, the side walls of said cap lying between the outer sides of the flanges and the inner sides of the clamping rings and being provided with apertures 16 for the passage therethrough of the through-bolts 12. This cap may be made of any suitable material, preferably of rubber, with a duck tread, which latter, together with the outer edges of the clamping rings 10, forms the tread of the tire.

From the foregoing it will be seen that the clamping rings 10 and the parts lying therebetween constitute in effect an outer wheel rim affording the tread of the wheel, with a resilient pneumatic body lying between the same and the inner rim proper of the wheel. The tire thus constructed is virtually puncture-proof, owing to the thickness and largely metallic character of its tread.

17 designates the inner air retaining tube which, it will be observed, can be readily inserted through the outer slit of the tire envelop by simply removing the clamping rings and the cap, when the latter is employed. This cap, while a useful adjunct of the tire for the purpose of excluding dirt, dust and moisture from the interior thereof, is not absolutely necessary, as the slit in the tire can be closed so as to be practically dirt and moisture proof by drawing the clamping rings sufficiently hard against the flanges 9 between which the slit is formed.

The tire-body is fastened to the rim and felly by a suitable number of headed bolts 18 applied at intervals along the rim, the said bolts having heads 19 engaging the inner surface of the tire sheath or envelop, and drawing the latter tightly to its seat in the rim by means of suitable nuts 20.

The particular form of the clamping rings and the presence of the cap 15 are not of the essence of the invention; and the construction may be otherwise modified in minor details without departing from the spirit or sacrificing any of the advantages of the invention.

I claim:

1. The combination with a tire-body having a longitudinally split outer periphery and radially projecting flanges on either side of said split portion, of metal clamping rings applied to the outer sides of said flanges, the outer edges of said rings constituting in part the tread surface of the tire, and clamping bolts passed through said rings and flanges.

2. The combination with a tire-body having a longitudinally split outer periphery and radially projecting flanges on either side of said split portion, of metal clamping rings applied to the outer sides of said flanges and provided with base-portions engaging the tire-body at the bases of said flanges, the outer edges of said clamping rings forming the marginal parts of the tread surface of the tire, and clamping bolts passed through said rings and flanges.

3. The combination with a tire-body having a longitudinally split outer periphery and radially projecting flanges on either side of said split portion, of a channel-shaped annular cap covering said flanges, metal clamping rings applied to the outer sides of said cap the outer edges whereof form parts of the tread surface of the tire, and clamping-bolts passed through said rings, cap and flanges.

4. The combination with a tire-body having a longitudinally split outer periphery and radially projecting flanges on either side of said split portion, of a channel-shaped annular cap covering said flanges, metal clamping rings the outer edges whereof form parts of the tread surface of the tire applied to the outer sides of said cap and provided with base portions engaging the tire-body at the bases of said flanges, and clamping bolts passed through said rings, cap and flanges.

JOHN L. G. DYKES.

Witnesses:
GERTRUDE BINGHAM,
JOHN T. BREEN.